April 20, 1926.
A. W. MORSE
NEBULIZER
Filed Sept. 13, 1924
1,581,759
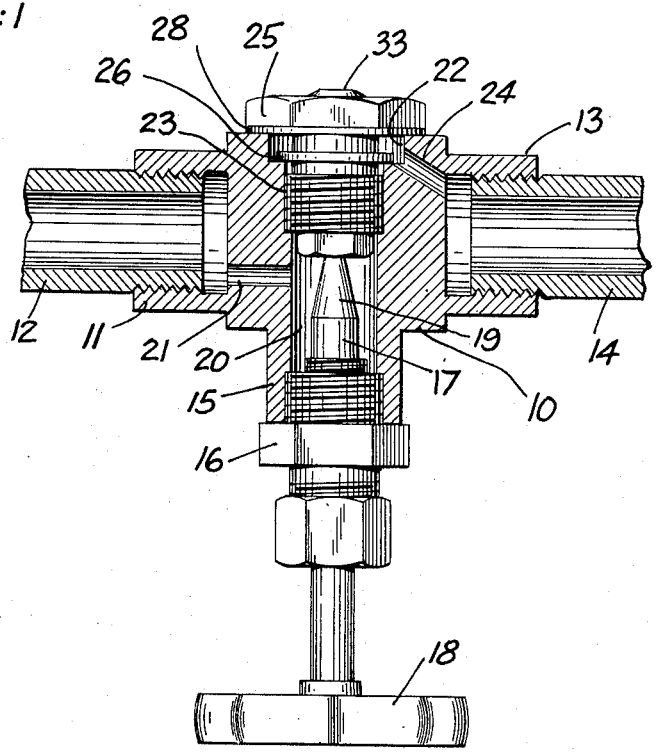
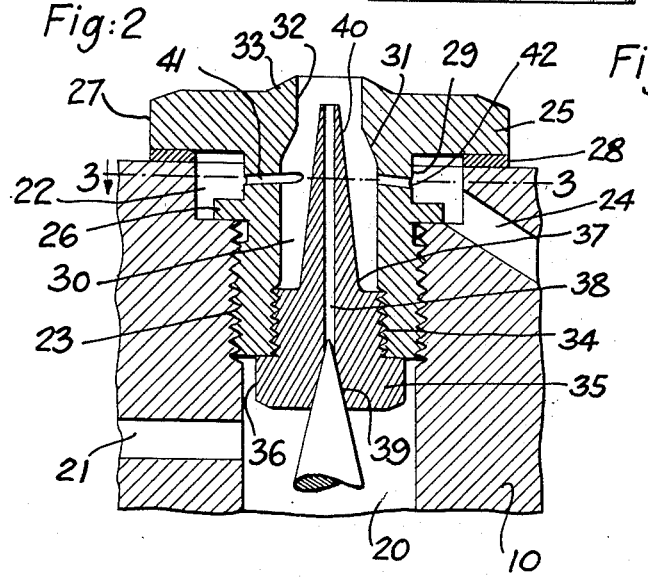
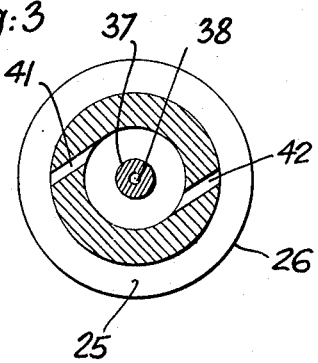
Albert W. Morse
INVENTOR
BY Walter E. Wollheim
ATTORNEY Patented Apr. 20, 1926.

1,581,759

UNITED STATES PATENT OFFICE.

ALBERT W. MORSE, OF LONG ISLAND CITY, NEW YORK.

NEBULIZER.

Application filed September 13, 1924. Serial No. 737,584.

*To all whom it may concern:*

Be it known that I, ALBERT W. MORSE, a citizen of the United States, and a resident of Long Island City, in the county of Queens and State of New York, have invented certain new and useful Improvements in Nebulizers, of which the following is a specification.

This invention relates to nebulizers of liquids, that is apparatus for causing liquids to assume the form of an extremely fine mist, and the invention is especially applicable to be used in connection with oil burners in which the fuel oil pressure is relatively low, and where a very small capacity of oil discharge is desired.

It is one of the objects of the invention to equip oil burners of this kind with a nebulizer which will discharge a very fine spray or mist of oil of relatively narrow proportion, so as to cause a comparatively small angle of dispersion of spray which prevents the spray from coming in contact with combustion chamber surfaces adjacent to the burner outlet.

Another object is to provide a nebulizer of this type with an inner oil nozzle extending so far into its outlet that the liquid issuing therefrom does not impinge the walls of the outlet, thereby eliminating a dribbling of oil along the outlet due to capillary attraction.

A still further object is to so arrange the seating surfaces of the nebulizer with the burner that leakage of oil within the burner is prevented.

Other objects will appear in the following specification in which a liquid fuel burner embodying a preferred form of the invention is disclosed.

The invention is illustrated by means of the accompanying drawings, in which

Fig. 1 is a vertical longitudinal sectional view of the burner, showing an outside view of the nebulizer proper;

Fig. 2 is a fragmentary enlarged vertical longitudinal sectional view of the nebulizer proper; and Fig. 3 is a cross sectional view along the plane of line 3—3, in Fig. 2.

Like characters of reference denote similar parts throughout the several views and the following specification.

10 is a body of the burner. 11 is a tubular extension on one side of the body 10, threaded to receive an oil pipe 12. The opposite end of the body 10 is provided with a similar extension 13 threaded for an air pipe 14. Centrally between these extensions, body 10 is extended at 15 to receive a screw bonnet 16 into which a spindle 17 can be reciprocated. 18 is a suitable hand wheel affixed to the outer end of spindle 17. The innermost end of spindle 17 is provided with a long taper 19. 20 is a central cylindrical chamber through the body in alignment with spindle 17. 21 is a duct connecting chamber 20 with the oil supply pipe 12. 22 is a cylindrical recess in alignment with chamber 20 in body 10 at its end opposite to that into which bonnet 16 is screwed. 23 is a threaded portion connecting the recess 22 with chamber 20, of a diameter smaller than that of the recess and a little larger than the diameter of chamber 20. 24 is a duct connecting recess 22 with the air supply pipe 14.

Screwed into the body 10, opposite bonnet 16, engaging threaded portion 23 is a nebulizer plug 25 which is provided with a flange 26 of a diameter, larger than threaded portion 23, contacting with the bottom of recess 22 and making a leak proof joint therewith. 27 is a flange at the outer end of the nebulizer plug 25, preferably polygonal in shape for gripping purposes, which makes a tight joint with body 10 by means of a slightly compressible gasket 28 interposed between the body and the flange. The part of the nebulizer plug between outer flange 27 and inner flange 26 is somewhat reduced in diameter at 29. 30 is a central cylindrical chamber within the nebulizer plug, tapered at 31 to continue as an outlet passage 32 of smaller diameter than that of chamber 30 and which terminates in the center of a frusto-conical projection 33 centrally disposed at the outer surface of flange 27. The end of chamber 30, opposite its outlet, is threaded to receive a correspondingly threaded part 34 of an oil nozzle 35, which is provided with a flange 36, polygonal in shape for gripping purposes, to make a tight joint with the plug. The other end of the nozzle, within the chamber, is extended in tubular form at 37, and extends to a point in the outlet passage 32, closely adjacent to its final outlet opening. 38 is an inlet opening of relatively small size through nozzle 35, having one end tapered to form a seat 39 for the tapered end of spindle 17. The outside of the tubular extension 37 of the nozzle is also tapered at 40, diminishing in diameter toward the outlet end. 41 and 42 are ducts through the reduced portion 29 of the nebulizer plug terminating in the central chamber 30, and so positioned as to impinge the circumference of this central chamber tangentially, as shown in Fig. 3; they are further slightly inclined toward the outlet end.

The operation of the device is, as follows:

Oil is admitted, under pressure, through supply pipe 12, whence it passes through duct 21 and through valve controlled opening 38 of the oil nozzle and is discharged through final outlet passage 32. Air is admitted, also under pressure, into the chamber 30 through pipe 14, duct 24 and tangential orifices 41 and 42. By means of the tangential direction of orifices 41 and 42, the air is given a whirling motion within the chamber 30 and around the tubular extension 37 of the oil nozzle and in passing out through outlet 32 thoroughly mixes with the oil which is atomized thereby, and the combined mixture is discharged in form of a vapor or mist.

Attention is particularly drawn to the fact that the outlet end of oil nozzle 35 projects into the final outlet passage 32 and ahead of the air inlets 41 and 42 to the chamber 30, whereby the oil issuing from the nozzle does not impinge the walls of the chamber or the outlet passage. In nebulizers as heretofore constructed, the outlet for the oil was located within the chamber, and the mixture of oil and air impinged the walls of the final outlet of the nebulizer, resulting often in a dribbling of oil along the outlet due to capillary attraction, under certain operating conditions.

Furthermore, the diameter of the chamber 30 at and near a plane through the air inlets 41 and 42 and its diameter at a plane through the outlet end of the oil nozzle are so proportioned that the area of the air passage is preferably decreased toward the outlet end whereby its velocity is correspondingly increased. The oil nozzle is equipped with the valve seat and can be renewed easily and quickly, if the seat is worn, or if, for purposes of regulation, a different size of oil passage in the nozzle is required to adapt the same to differences in pressures.

While in the usual construction of nebulizer, the final outlet is of a very small size, sometimes 50 or even 64 drill, with nebulizers of the kind described, the same may be of relatively large outlet diameter, and have been successfully made with ¼" openings.

By the passage of air around the outlet end of the oil nozzle within the passage 32, a relatively narrow spray or mist of mixture is discharged which does not impinge the walls of the usual form of combustion block through which the mixture is discharged into the firepot which in former designs where the mixture did impinge these walls, frequently caused backfiring of the burner.

Flange 26 contacting with the bottom of recess 22 of the body 10, prevents any leakage of oil through the threaded portion of the plug.

While I have shown the air inlet orifices 41 and 42 tangential to the inner wall of the chamber 30, in certain cases I dispose the same at right angles to the longitudinal axis of the chamber and I do not wish to limit myself to the tangential direction of these orifices.

It is understood that various changes in the form, proportion and minor details of construction may be resorted to without departing from the principle or sacrificing any of the advantages of the invention, as defined in the appended claims.

What I claim as new, is:

1. A nebulizer comprising a structure having a cylindrical chamber in its center with a nebulizing outlet at one end and transverse air inlet orifices through its walls and substantially tangent to the walls thereof, and a nozzle for a liquid to be nebulized, having a central outlet, at the other end of the said chamber and extending into its nebulizing outlet.

2. A nebulizer comprising a structure having a cylindrical chamber in its center with a nebulizing outlet at one end of relatively large diameter, but smaller than that of the said chamber, and small air inlet orifices drilled through its side wall adjacent the said nebulizing outlet, and a nozzle for a liquid to be nebulized inserted into the other end of the said chamber, having a relatively small discharge orifice located within the said nebulizing outlet and a seat at the nozzle inlet to receive a valve for the purpose of controlling the said liquid.

3. In a liquid fuel burner, the combination of a body casing having a fuel connection and an air connection, a valve for the fuel, a nebulizer comprising a structure having a cylindrical chamber in its center with a nebulizing outlet at one end and transverse air inlet orifices through its walls, and a nozzle for the fuel at the other end of the said chamber and extending into its nebulizing outlet, the said nozzle having a seat for the said valve, and an annular recess in the body casing at its discharge side, surrounding the outer terminals of the said air inlet orifices, the said body casing having a passage connecting the said recess and the said air connection, the said nebulizer having a relatively small flange making a tight joint with the bottom of the said recess and a relatively large flange making a tight joint with the casing, the outer terminals of the said air inlet orifices being located between the said small and large flanges of the nebulizer.

In testimony whereof I have hereunto set my hand and seal.

ALBERT W. MORSE. [L. S.]